US009158929B2

(12) United States Patent
Worth et al.

(10) Patent No.: US 9,158,929 B2
(45) Date of Patent: Oct. 13, 2015

(54) CELL LEVEL DATA ACCESSIBILITY

(71) Applicant: Bank of America Corporation, Charlotte, NC (US)

(72) Inventors: Carey W. Worth, Waxhaw, NC (US); Manoj Bohra, North Brunswick, NJ (US); Kenneth L. Lindeman, Gastonia, NC (US); Sri L. Chigurupati, Princeton, NJ (US)

(73) Assignee: Bank of America Corporation, Charlotte, NC (US)

( * ) Notice: Subject to any disclaimer, the term of this patent is extended or adjusted under 35 U.S.C. 154(b) by 59 days.

(21) Appl. No.: 13/942,076

(22) Filed: Jul. 15, 2013

(65) Prior Publication Data

US 2015/0020215 A1    Jan. 15, 2015

(51) Int. Cl.
*G06F 17/30* (2006.01)
*G06F 21/62* (2013.01)

(52) U.S. Cl.
CPC ...................................... *G06F 21/62* (2013.01)

(58) Field of Classification Search
CPC .............. G06F 21/6227; G06F 21/604; G06F 21/6245; G06F 2221/2145
USPC ........................ 726/1, 2, 27, 28; 707/999.009
See application file for complete search history.

(56) References Cited

U.S. PATENT DOCUMENTS

| 7,996,373 | B1 | 8/2011 | Zoppas et al. | |
| 8,214,319 | B2 | 7/2012 | Gould et al. | |
| 8,255,370 | B1 | 8/2012 | Zoppas et al. | |
| 2004/0054933 | A1* | 3/2004 | Wong et al. | 713/202 |
| 2006/0206485 | A1* | 9/2006 | Rubin et al. | 707/9 |
| 2007/0136237 | A1* | 6/2007 | Barker et al. | 707/2 |

* cited by examiner

*Primary Examiner* — Brian Shaw
(74) *Attorney, Agent, or Firm* — Banner & Witcoff, Ltd.; Michael A. Springs

(57) ABSTRACT

Methods, systems, and computer-readable media for determining access rights for stored data are presented. Data tables may store data that is accessible to users. A request for explicit access to data may be received from a user. The system may determine the user's identity and further determine combined access rights based on the request for explicit access to data and the identity of the user. For example, implicit access rights for a user may be based on the identity. Based on the determined access rights, the system may retrieve data from the data tables. In an embodiment, the access rights may define that a first portion of a column is to be retrieved while a second portion of the column is to be restricted, or that a first portion of a row is to be retrieved while a second portion of the row is to be restricted.

19 Claims, 8 Drawing Sheets

| Person | Depart. | Division | Manager (Default) | Manager (Aligned) | Country | Info. 1 | Info. 2 | Info. 3 |
|---|---|---|---|---|---|---|---|---|
| Person 1 | 1 | 1.1 | A | A | US | | | |
| Person 2 | 1 | 1.1 | A | A | US | | | |
| Person 3 | 1 | 1.1 | A | A | UK | | | |
| Person 4 | 1 | 1.1 | A | A | UK | | | |
| Person 5 | 1 | 1.1 | B | B | US | | | |
| Person 6 | 1 | 1.1 | C | A | US | | | |
| Person 7 | 1 | 1.2 | B | B | UK | | | |
| Person 8 | 1 | 1.2 | B | B | US | | | |
| Person 9 | 1 | 1.2 | C | B | UK | | | |

FIG. 2

| Person | Depart. | Division | Manager (Default) | Manager (Aligned) | Country | Info. 1 | Info. 2 | Info. 3 |
|---|---|---|---|---|---|---|---|---|
| Person 10 | 2 | 2.1 | D | D | US | | | |
| Person 11 | 2 | 2.1 | C | D | US | | | |
| Person 12 | 2 | 2.2 | D | D | UK | | | |
| Person 13 | 2 | 2.2 | D | D | UK | | | |

FIG. 3

Report: Manager A

| Person | Depart. | Division | Manager (Default) | Manager (Aligned) | Country | Info. 1 | Info. 2 | Info. 3 |
|---|---|---|---|---|---|---|---|---|
| Person 1 | 1 | 1.1 | A | A | US | Access | Restrict | Restrict |
| Person 2 | 1 | 1.1 | A | A | US | Access | Restrict | Restrict |
| Person 5 | 1 | 1.1 | B | B | US | Access | Restrict | Access |
| Person 6 | 1 | 1.1 | C | A | US | Access | Restrict | Restrict |
| Person 8 | 1 | 1.2 | B | B | US | Access | Restrict | Access |
| Person 10 | 2 | 2.1 | D | D | US | Access | Restrict | Access |
| Person 11 | 2 | 2.1 | C | D | US | Access | Restrict | Restrict |

FIG. 6

Report: Manager B

| Person | Depart. | Division | Manager (Default) | Manager (Aligned) | Country | Info. 1 | Info. 3 |
|---|---|---|---|---|---|---|---|
| Person 1 | 1 | 1.1 | A | A | US | Access | Access |
| Person 2 | 1 | 1.1 | A | A | US | Access | Access |
| Person 5 | 1 | 1.1 | B | B | US | Access | Restrict |
| Person 6 | 1 | 1.1 | C | A | US | Access | Restrict |
| Person 8 | 1 | 1.2 | B | B | US | Access | Restrict |
| Person 10 | 2 | 2.1 | D | D | US | Access | Access |
| Person 11 | 2 | 2.1 | C | D | US | Access | Restrict |

FIG. 7

CELL LEVEL DATA ACCESSIBILITY

BACKGROUND

Aspects of the disclosure relate to computer hardware and software. In particular, one or more aspects of the disclosure generally relate to computer hardware and software that can be used to determine access rights for stored data.

The data stored by computing devices has grown exponentially in the recent past. In addition, large organizations store data of various types that require varying degrees of restrictions. For example, an organization may store a first type of data that may be accessible to any user, a second type of data that must be restricted from a first group of users, a third type of data that must be restricted from a second group of users, and so on. Accordingly, a system devised to grant access to portions of data while simultaneously restricting access to portions of data may be useful.

SUMMARY

Aspects of the disclosure provide various techniques that enable a mobile device to determine access rights for stored data based on, for example, implicit access rights for a user and explicit access rights.

Methods, systems, and computer-readable media for determining access rights for stored data are described according to an embodiment. One or more data tables may store data that is accessible to one or more users. A request for explicit access to data may be received from a user. The system may determine the user's identity and further determine combined access rights based on the request for explicit access to data and the identity of the user. Based on the determined access rights, the system may retrieve data from the one or more data tables. In an embodiment, the access rights may define that a first portion of a first column is to be retrieved while a second portion of the first column is to be restricted, or the access rights may define that a first portion of a first row is to be retrieved while a second portion of the first row is to be restricted. The retrieved data may then be returned to the requesting user.

In an embodiment, implicit data access may be determined based on the determined identity for the user. For example, the determined identity may comprise a role, and rules may determine implicit data access for one or more roles in the system. In an embodiment, the implicit data access rights may define that the second portion of the first column is to be restricted or that the second portion of the first row is to be restricted, as described above.

In an embodiment, the retrieved data may be formatted as a report and the report may be returned to the user. In an example, the report may be displayed to the user. For instance, data from the first portion of the first column may be displayed to the user while data from the second portion of the first column is not displayed to the user, and data from the first portion of the first row may be displayed to the user while data from the second portion of the first row is not displayed to the user. In an embodiment, not displaying data to the user may comprise displaying an indication that the data has been restricted.

These features, along with many others, are discussed in greater detail below.

BRIEF DESCRIPTION OF THE DRAWINGS

The present disclosure is illustrated by way of example and not limited in the accompanying figures in which like reference numerals indicate similar elements and in which:

FIGS. 2 and 3 illustrate example data structures according to an embodiment.

FIGS. 6 and 7 illustrate example reports generated by the system according to an embodiment.

DETAILED DESCRIPTION

In the following description of various embodiments, reference is made to the accompanying drawings, which form a part hereof, and in which is shown, by way of illustration, various embodiments in which aspects of the disclosure may be practiced. It is to be understood that other embodiments may be utilized, and structural and functional modifications may be made, without departing from the scope of the present disclosure.

As noted above, certain embodiments are discussed herein that relate to determining access rights for stored data. Before discussing these concepts in greater detail, however, an example of a computing device that can be used in implementing various aspects of the disclosure, as well as an example of an operating environment in which various embodiments can be implemented, will first be described with respect to FIGS. 1A and 1B.

Figure 1A:
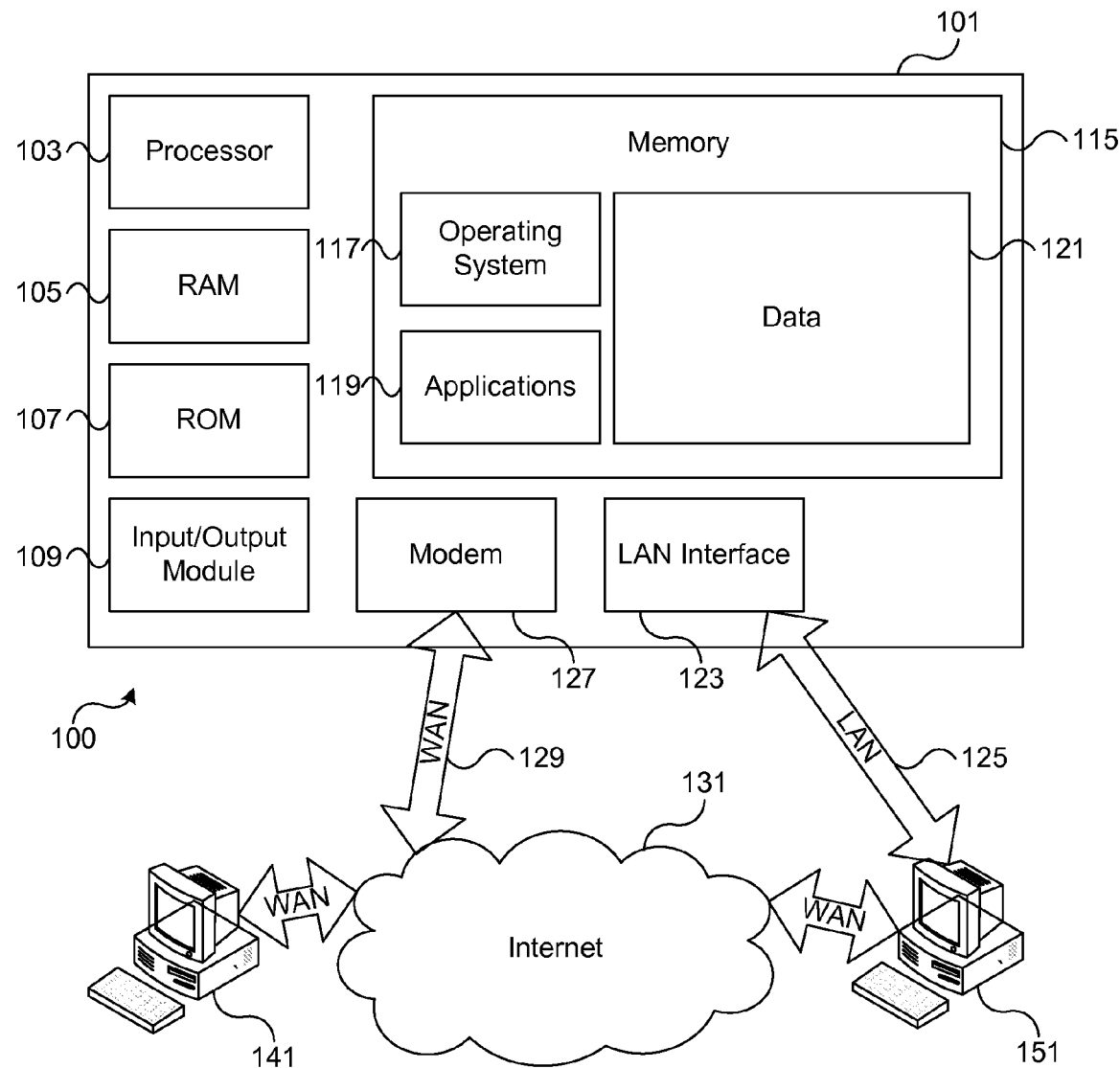
FIG. 1A illustrates an example operating environment according to an embodiment.

FIG. 1A illustrates an example block diagram of a generic computing device 101 (e.g., a computer server) in an example computing environment 100 that may be used according to one or more illustrative embodiments of the disclosure. The generic computing device 101 may have a processor 103 for controlling overall operation of the server and its associated components, including random access memory (RAM) 105, read-only memory (ROM) 107, input/output (I/O) module 109, and memory 115.

I/O module 109 may include a microphone, mouse, keypad, touch screen, scanner, optical reader, and/or stylus (or other input device(s)) through which a user of generic computing device 101 may provide input, and may also include one or more of a speaker for providing audio output and a video display device for providing textual, audiovisual, and/or graphical output. Software may be stored within memory 115 and/or other storage to provide instructions to processor 103 for enabling generic computing device 101 to perform various functions. For example, memory 115 may store software used by the generic computing device 101, such as an operating system 117, application programs 119, and an associated database 121. Alternatively, some or all of the computer executable instructions for generic computing device 101 may be embodied in hardware or firmware (not shown).

The generic computing device 101 may operate in a networked environment supporting connections to one or more remote computers, such as terminals 141 and 151. The terminals 141 and 151 may be personal computers or servers that include many or all of the elements described above with respect to the generic computing device 101. The network connections depicted in FIG. 1A include a local area network (LAN) 125 and a wide area network (WAN) 129, but may also include other networks. When used in a LAN networking environment, the generic computing device 101 may be connected to the LAN 125 through a network interface or adapter 123. When used in a WAN networking environment, the generic computing device 101 may include a modem 127 or other network interface for establishing communications over the WAN 129, such as the Internet 131. It will be appreciated that the network connections shown are illustrative and other means of establishing a communications link between the computers may be used. The existence of any of various well-known protocols such as TCP/IP, Ethernet, FTP, HTTP, HTTPS, and the like is presumed.

Generic computing device 101 and/or terminals 141 or 151 may also be mobile terminals (e.g., mobile phones, smartphones, PDAs, notebooks, and so on) including various other components, such as a battery, speaker, and antennas (not shown).

The disclosure is operational with numerous other general purpose or special purpose computing system environments or configurations. Examples of well-known computing systems, environments, and/or configurations that may be suitable for use with the disclosure include, but are not limited to, personal computers, server computers, hand-held or laptop devices, multiprocessor systems, microprocessor-based systems, set top boxes, programmable consumer electronics, network PCs, minicomputers, mainframe computers, distributed computing environments that include any of the above systems or devices, and the like.

Figure 1B:
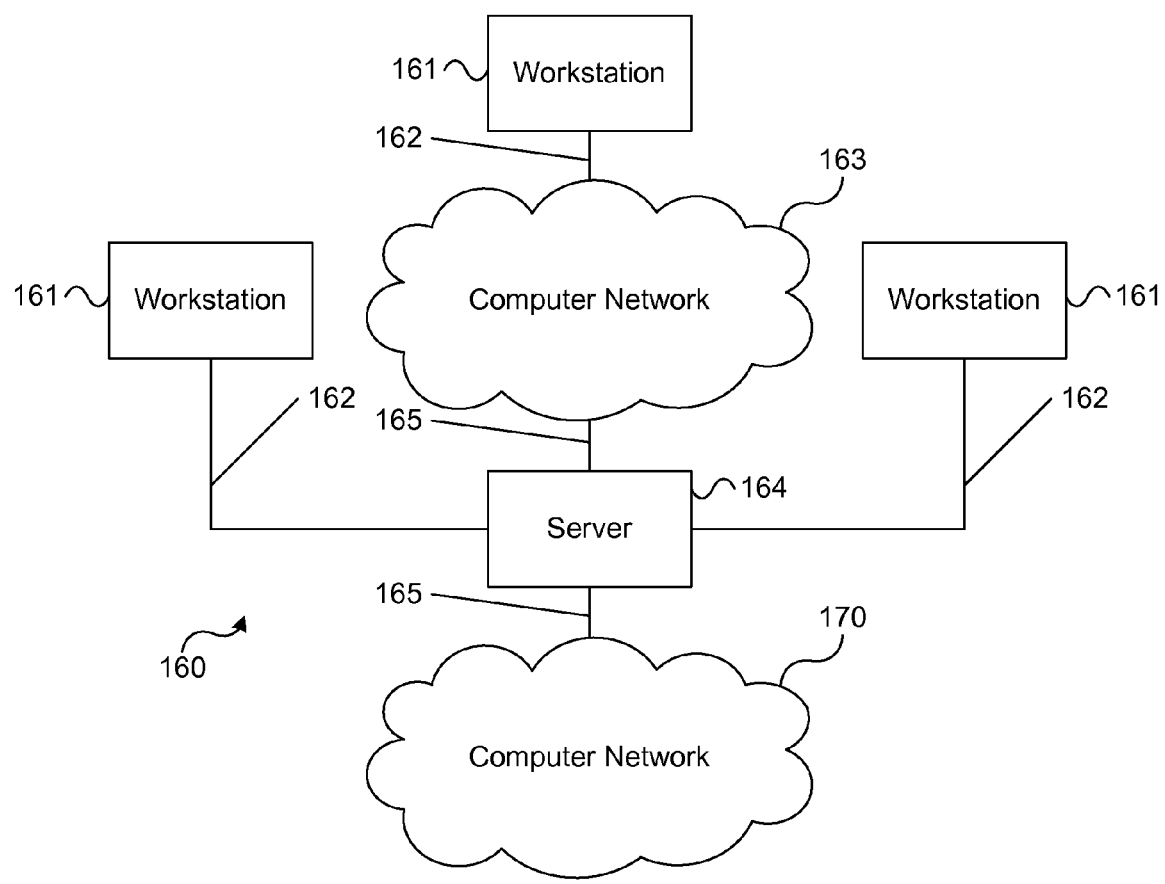
FIG. 1B illustrates another example operating environment according to an embodiment.

FIG. 1B illustrates another example operating environment in which various aspects of the disclosure may be implemented. As illustrated, system 160 may include one or more workstations 161. Workstations 161 may, in some examples, be connected by one or more communications links 162 to computer network 163 that may be linked via communications links 165 to server 164. In system 160, server 164 may be any suitable server, processor, computer, or data processing device, or combination of the same. Server 164 may be used to process the instructions received from, and the transactions entered into by, one or more participants.

According to one or more aspects, system 160 may be associated with a financial institution, such as a bank. Various elements may be located within the financial institution and/or may be located remotely from the financial institution. For instance, one or more workstations 161 may be located within a branch office of a financial institution. Such workstations may be used, for example, by customer service representatives, other employees, and/or customers of the financial institution in conducting financial transactions via network 163. Additionally or alternatively, one or more workstations 161 may be located at a user location (e.g., a customer's home or office). Such workstations also may be used, for example, by customers of the financial institution in conducting financial transactions via computer network 163 or computer network 170.

Computer network 163 and computer network 170 may be any suitable computer networks including the Internet, an intranet, a wide-area network (WAN), a local-area network (LAN), a wireless network, a digital subscriber line (DSL) network, a frame relay network, an asynchronous transfer mode network, a virtual private network (VPN), or any combination of any of the same. Communications links 162 and 165 may be any communications links suitable for communicating between workstations 161 and server 164, such as network links, dial-up links, wireless links, hard-wired links, and/or the like.

Having described an example of a computing device that can be used in implementing various aspects of the disclosure and an operating environment in which various aspects of the disclosure can be implemented, several embodiments will now be discussed in greater detail.

In an embodiment, a system may determine access rights for a data. For example, a system may store data associated with one or more entities and the system may determine access rights for the stored data. In such an example, the entities may comprise employees of an organization. In another embodiment, the stored data may comprise any suitable data.

In an example, the system may store non-confidential data about an employee, such as department information, manager information, and the like, and confidential data about the employee, such as compensation, performance, diversity information, personal contact information, nationality, citizenship, and the like. The system may determine access rights for the stored data.

FIG. 2 illustrates an example data structure for storing data in accordance with an embodiment. For example, data structure 200 of FIG. 2 may include entries 201 that correspond to Persons 1-9. Columns 202-201 may store data associated with persons 1-9. For instance, column 202 may store person identification information, such as a person ID number, column 203 may store department identification information, such as a department name or number, column 204 may store division identification information, such as a division name or number, column 205 may store default manager information, such as a default manager name or manager number, column 206 may store aligned manager information, such as an aligned manager name or manager number, column 207 may store country information, such as an assigned country, columns 208 may store non-confidential information, and columns 209-210 may store confidential information, such as compensation, performance, diversity information, personal contact information, nationality, citizenship, and the like.

A row and column intersection may comprise a data indicated by the particular column for the person according to the particular row. For example, the first row of entries 201 may store data about person 1. Accordingly, the intersection between the first row and column 204 may comprise data about the division information for person 1. In an embodiment, data structure 200 may be realized in any suitable manner. For instance, data structure 200 may be a portion of a database, may comprise a flat file system, may comprise a table based data store, or the like.

FIG. 3 also illustrates an example data structure for storing data in accordance with an embodiment. For example, data structure 300 of FIG. 3 may include entries 301 that correspond to persons 10- 13. Columns 302-310 may store data associated with persons 10- 13. Data structure 300 may comprise a data structure similar to data structure 200 of FIG. 2, as described above. In an embodiment, data structure 300 may be realized in any suitable manner. For instance, data structure 300 may be a portion of a database, may comprise a flat file system, may comprise a table based data store or the like.

In an embodiment, data structure 200 and data structure 300 may be portions of a system for determining access rights to data. In another embodiment, data structure 200 and data structure 300 may store any suitable data.

In an embodiment, the system may determine which portions of data structure 200 and/or data structure 300 may be accessed. For instance, one or more rules may be stored that determine what data may be accessed. In an example, a user may request access to data stored in data structure 200. A rule may determine that the user may access data for persons associated with division 1.1, or persons 1-6. However, one or more additional rules may restrict column access for the user. As such, one or more rules may allow that the user access columns 208-210 for any person with the default manager A, but may restrict access to columns 208-210 for any person with the default manager B or C. In this example, the user may have access to columns 202-207 for all of persons 1-6. However, the requester may only have access to columns 208-210 for persons 1-4. This is because the default manager for persons 1-4 comprises manager A, however the default manager for persons 5 and 6 comprise managers B and C respectively.

Accordingly, in an embodiment, for data structure 200 and/or data structure 300, the system may allow access to a first portion of a row while restricting access to a second portion of the row and/or the system may allow access a first portion of a column while restricting access to a second portion of the column. In another embodiment, an access determination may be made for each cell included in data structure 200 and/or data structure 300 based on one or more rules for the system.

Figure 4:
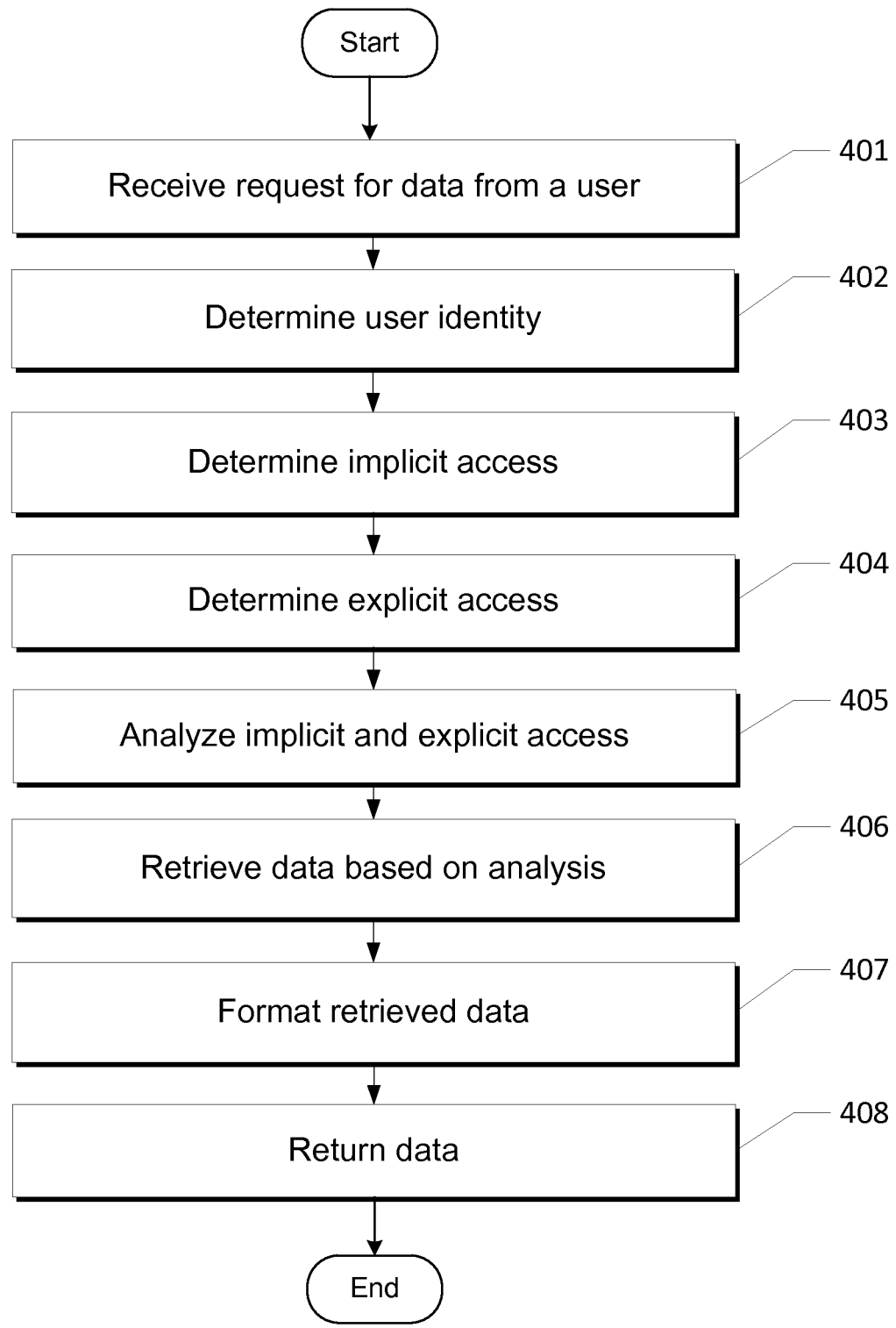
FIG. 4 illustrates an example method for determining access rights for stored data according to an embodiment.

FIG. 4 illustrates an example method for determining access rights for data in accordance with an embodiment. For example, FIG. 4 may determine access rights for data stored in data structure 200 and/or data structure 300. The process of FIG. 4 may begin at step 401, where a request for data is received from a user. For example, a user, such as an employee of an organization, may request data from data structure 200 and/or data structure 300. In an embodiment, the request may be a request for a report that comprises data from data structure 200 and/or data structure 300.

The process of FIG. 4 may proceed from step 401 to step 402, where a user identity is determined. For example, an identity for the requesting user may be determined. In an embodiment, the requesting user may comprise a manager, a supervisor, an administrator, such as a human resource administrator, or any other suitable role, for instance, a role in an organization.

The process of FIG. 4 may proceed from step 402 to step 403, where implicit access may be determined. For example, implicit access for the user, based on the user's identity, may be determined. The implicit access may be defined by one or more rules. In an embodiment, the user may be identified as a manager and managers may have one or more rules that define their implicit access to data.

For example, a manager may have a span of control rule that allows the manager access to certain data for employees that are under the manager's span of control. In this example, this data may comprise non-confidential information, compensation, performance information, personal contact information, emergency contact information, and the like. In an embodiment, the span of control rule may additionally include restrictions on the data that a manager has access to for the employees that are under the manager's span of control. This restricted data may comprise payroll information, benefits information, diversity information, citizenship, and the like.

In another example, a manager may have a manager's rule that allows organization managers access to certain data fields for employees of the organization. In this example, this data may comprise non-confidential information, compensation, performance information, personal contact information, emergency contact information, and the like. In an embodiment, the manager's rule may additionally include restrictions on the data that a manager has access to for organization employees. This restricted data may comprise payroll information, benefits information, diversity information, citizenship, and the like.

In an embodiment, the manager's rule may also restrict access to certain data for an employee when the employee is a designated employee. For example, when an employee is designated as a first type of employee, such as a rotational employee, the manager's rule may restrict access to certain data for the rotational employee. For instance, data structure 200 of FIG. 2 includes default manager column 205 and aligned manager column 206. When an employee's default manager is associated with a predetermined department, such as a rotational department, the employee may be designated as a first type of employee, such as a rotational employee. For example, person 6 shows a default manager C. When the default manager C is associated with a predetermined department, person 6 may be designated as a first type of employee. In an embodiment, for the first type of employee, the manager's rule may restrict access to data such as compensation, performance information, personal contact information, emergency contact information, payroll information, benefits information, diversity information, citizenship, and the like. For instance, the manager's rule may restrict access to confidential information for the first type of employee.

The process of FIG. 4 may proceed from step 403 to step 404, where explicit access may be determined. For example, explicit access may be determined based on the explicit data requested by the user.

In an embodiment, explicit access may comprise row access and column access. For example, row access may comprise the persons for which data is being requested. For instance, data structure 200 of FIG. 2 includes department column 203, division column 204, default manager column 205, aligned manager column 206 and country column 207. Any of these columns may be leveraged in order to indicate the persons for which data is being requested. In an example, a requester may request explicit access to data for persons in department 1, division 1.1., with the default manager A, in any country. This would result in explicit access for person 1, person 2, person 3, and person 4. In an embodiment, any combination of these columns may be used to request explicit data access.

In an embodiment, column access may comprise the type of data that is being requested. For instance, data structure 200 of FIG. 2 includes columns 208-210. Column 208 may store non-confidential information. Columns 209-210 may store confidential information, such as compensation, performance, diversity information, personal contact information, nationality, citizenship, and the like. Explicit column access may comprise which of columns 208-210 are being requested. For example, data may be requested from column 208, 209, 210, or any combination of these columns.

In an embodiment, explicit data access may comprise a combination of row access and column access. In an example using data structure 200 of FIG. 2, a request may comprise a request for explicit access to data for persons in department 1, division 1.1., with the default manager A, in any country, and a request for explicit access to data from columns 208 and 209. This would result in explicit access for columns 208 and 209 for person 1, person 2, person 3, and person 4. Any other suitable request for explicit data access may be processed by the system in a similar manner.

The process of FIG. 4 may proceed from step 404 to step 405, where implicit and explicit data access is analyzed. For example, implicit and explicit data access may both be determined, and the determined access rights may be analyzed. In an embodiment, a user, such as a manager, may request explicit access for data, however a rule that defines implicit access may restrict access to this data for the user. This analysis will be further described with reference to FIGS. 5-7. In an embodiment, access rights for data may be determined based on the analysis.

The process of FIG. 4 may proceed from step 405 to step 406, where data may be retrieved based on the analysis. For example, implicit and explicit data access may be analyzed and data access rights may be determined based on the analysis. Data may be retrieved, for example, from data structure 200 of FIG. 2, based on these determined data access rights.

The process of FIG. 4 may proceed from step 406 to step 407, where the retrieved data may be formatted. For example, a received request may be a request for a report, and the retrieved data may be formatted into a report. FIGS. 6 and 7 illustrate example reports in accordance with an embodiment, as further describe below. The process of FIG. 4 may proceed from step 407 to step 408, where the data may be returned to the requesting user. For example, the data may be returned in the form of a report.

In an embodiment, the method of FIG. 4 may include additional steps, and any described steps may be omitted. In another embodiment, data structure 200 of FIG. 2 and data structure 300 of FIG. 3 may store any suitable data, and the method of FIG. 4 may determine access rights for the data stored in data structure 200 and/or data structure 300.

Figure 5:
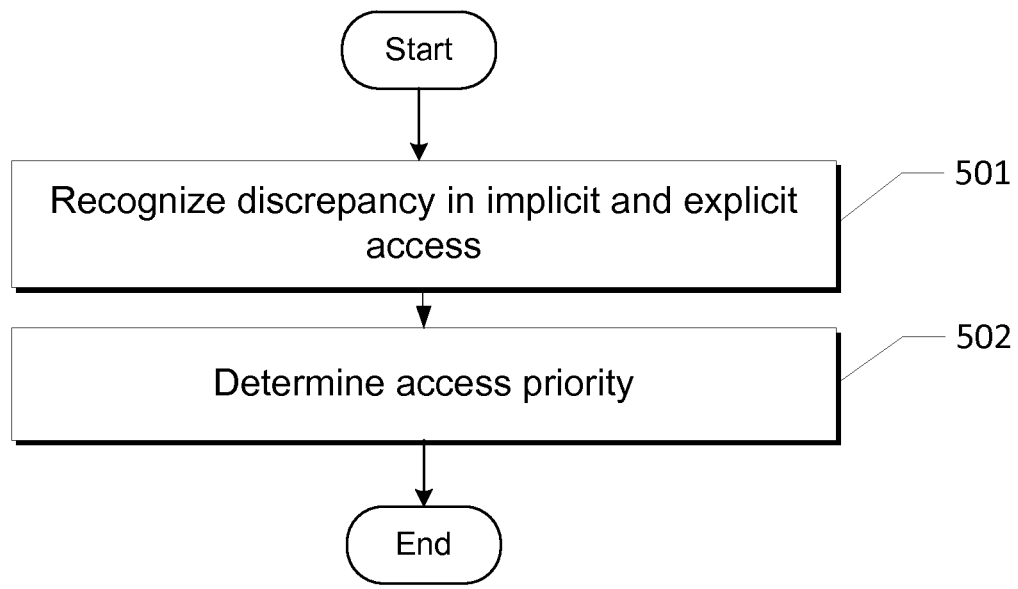
FIG. 5 illustrates an example method for analyzing access rights for stored data according to an embodiment.

FIG. 5 illustrates an example method for analyzing access rights for data in accordance with an embodiment. For example, step 405 of FIG. 4 may further comprise the method steps of FIG. 5. The process of FIG. 5 may begin at step 501, where discrepancies are recognized between implicit and explicit data access.

For example, a user, such as a manager, may request explicit access for data, such as diversity data for an employee under the manager's span of control. However, an implicit rule may restrict a manager from having access to diversity data for an employee under the manager's span of control. Accordingly, a discrepancy may exist between the implicit data access and the explicit data access.

The process of FIG. 5 may proceed from step 501 to step 502, where an access priority is determined. For example, where a discrepancy is recognized between implicit data access and explicit data access, a priority may be determined. In the example where a manager requests explicit access to data that the manager is restricted from accessing based on implicit data rules, as described above, the implicit data rules may take priority. Accordingly, the manager may be restricted from accessing data that has been explicitly requested based on implicit data rules.

In an embodiment, explicit data access may take priority over an implicit data restriction. In another embodiment, either explicit data access or implicit data access may allow a user access to the requested data. In another embodiment, implicit data restrictions may take priority over explicit data access. Step 406 of FIG. 4 may be based on the method of FIG. 5.

FIG. 6 illustrates an example report that may be generated based on the method of FIG. 4. For example, a manager, such as manager A, may request access to data, for example data stored in data structure 200 of FIG. 2 and data structure 300 of FIG. 3. In the example illustrated in FIG. 6, manager A requests access to data for persons in department 1 or department 2 within the United States. Based on the entries in data structure 200 and data structure 300, this includes person 1, person 2, person 5, person 6, person 8, person 10, and person 11.

In this example, manager A requests data in columns 608-610. In an embodiment, one or more of columns 602-607 may be included by default in a report or may be omitted from a report. Column 608 may store information 1 which comprises non-confidential information, column 609 may store information 2 which comprise a first type of confidential information, and column 610 may store information 3 which comprises a second type of confidential information.

Based on manager A's explicit data access, the report may include data from columns 608-610 about person 1, person 2, person 5, person 6, person 8, person 10, and person 11. Column 608 may be accessible to manager A since column 608 stores non-confidential information. However, based on implicit data restrictions, certain data may be restricted.

For example, column 609 may store a first type of confidential information for employees. Based on an implicit rule, the information in column 609 may be restricted from all managers of the organization. Accordingly, the report may list "restricted" for the cells within column 609.

In another example, column 610 may store a second type of confidential information for employees. Based on an implicit rule, the information in column 610 may be restricted from a manager when an employee in a corresponding row is under the span of control for that manager. Accordingly, when an employee is under the span of control of manager A, column 610 corresponding to that employee may list "restricted" in the report. For instance, person 1 and person 2 list manager A as their default manager. This may indicate that person 1 and person 2 are under the span of control of manager A. Accordingly, column 610 in the rows corresponding to person 1 and person 2 list "restricted" in the report.

In another example, person 6 and person 11 may comprise designated employees according to an embodiment. For example, person 6 and person 11 list manager C as a default manager. A default manager that comprises manager C may indicate that person 6 and person 11 are a first type of employee, such as a rotational employee. Based on an implicit rule, data in columns 609 and 610 may be restricted from access by a manager of the organization when the employee in the corresponding row is a first type of employee. Accordingly, columns 609 and 610 in the rows corresponding to person 6 and person 11 list "restricted" in the report.

FIG. 7 also illustrates an example report that may be generated based on the method of FIG. 4. The report illustrated in FIG. 7 may be similar to the report illustrated in FIG. 6, however the report illustrated in FIG. 7 may be requested by manager B. For example manager B may request access to data, for example data stored in data structure 200 of FIG. 2 and data structure 300 of FIG. 3. In the example illustrated in FIG. 7, manager B requests access to data for persons in department 1 or department 2 within the United States. Based on the entries in data structure 200 and data structure 300, this includes person 1, person 2, person 5, person 6, person 8, person 10, and person 11.

In this example, manager B requests data in columns 708 and 709. In an embodiment, one or more of columns 702-707 may be included by default in a report or may be omitted from a report. Column 708 may store information 1 which comprises non-confidential information and column 709 may store information 3 which comprises confidential information.

In an embodiment, column 708 may correspond to column 608 of FIG. 6 and column 709 may correspond to column 610 of FIG. 6. In this example, column 609 of FIG. 6 is absent from FIG. 7 because manager B did no explicitly request data corresponding to the data from column 609.

Based on manager B's explicit data access, the report may include data from columns 708 and 709 about person 1, person 2, person 5, person 6, person 8, person 10, and person 11. Column 709 may be accessible to manager B since column 708 stores non-confidential information. However, based on implicit data restrictions, certain data may be restricted.

For example, column 709 may comprise confidential information for employees. Based on an implicit rule, the information in column 709 may be restricted from a manager when an employee in a corresponding row is under the span of control for that manager. Accordingly, when an employee is under the span of control of manager B, column 709 corresponding to that employee may list "restricted" in the report. For instance, person 5 and person 8 list manager B as their default manager. This may indicate that person 5 and person 8 are under the span of control of manager B. Accordingly, column 709 in the rows corresponding to person 5 and person 8 list "restricted" in the report.

In another example, person 6 and person 11 may comprise designated employees according to an embodiment. For example, person 6 and person 11 list manager C as a default manager. A default manager that comprises manager C may indicate that person 6 and person 11 are a first type of employee, such as a rotational employee. Based on an implicit rule, data in column 709 may be restricted from access by a manager of the organization when the employee in the corresponding row is a first type of employee. Accordingly, column 709 in the rows corresponding to person 6 and person 11 list "restricted" in the report.

In an embodiment, column 610 of FIG. 6 and column 709 of FIG. 7 may illustrate a difference in implicit data access rights between manager A and manager B. For example, as described in embodiments above, manager A and manager B both request data access about persons in department 1 or department 2 within the United States. In addition, manager A and manager B both request column access to information 3, included in column 610 for FIG. 6 and column 709 for FIG. 7. As illustrated, column 610 of FIG. 6, corresponding to a report for manager A, displays different access than column 709 of FIG. 7, corresponding to a report for manager B. For example, the report for manager A allows access to information 3 for person 5 and person 8 but restricts access for person 1 and person 2. On the other hand, the report for manager B restricts access to information 3 for person 5 and person 8 and allows access for person 1 and person 2. This difference may exemplify the difference between implicit access rights for manager A and manager B.

In an embodiment, information that is restricted may list "restricted" in a report, as illustrated in FIGS. 6 and 7. In another embodiment, a text field may list "restricted" or any other suitable text, a data field may list blank, null, or any other suitable value, and a date field may list 01-01-1000 or any other suitable date.

In an embodiment, the system may comprise a web based system, where the request is received from a user's computing device over a network and the retrieved data is returned to the user's computing device over a network. For example, a generated report may be returned to the user's computing device. The report may comprise an HTML document, an XML document, a .doc document, a .pdf document, an .xls document, or any other suitable document. In another embodiment, the system may be employed using any suitable framework.

Various aspects described herein may be embodied as a method, an apparatus, or as one or more computer-readable media storing computer-executable instructions. Accordingly, those aspects may take the form of an entirely hardware embodiment, an entirely software embodiment, or an embodiment combining software and hardware aspects. Any and/or all of the method steps described herein may be embodied in computer-executable instructions stored on a computer-readable medium, such as a non-transitory computer readable memory. Additionally or alternatively, any and/or all of the method steps described herein may be embodied in computer-readable instructions stored in the memory of an apparatus that includes one or more processors, such that the apparatus is caused to perform such method steps when the one or more processors execute the computer-readable instructions. In addition, various signals representing data or events as described herein may be transferred between a source and a destination in the form of light and/or electromagnetic waves traveling through signal-conducting media such as metal wires, optical fibers, and/or wireless transmission media (e.g., air and/or space).

Aspects of the disclosure have been described in terms of illustrative embodiments thereof. Numerous other embodiments, modifications, and variations within the scope and spirit of the appended claims will occur to persons of ordinary skill in the art from a review of this disclosure. For example, one of ordinary skill in the art will appreciate that the steps illustrated in the illustrative figures may be performed in other than the recited order, and that one or more steps illustrated may be optional in accordance with aspects of the disclosure.

What is claimed is:

1. A computer implemented method, comprising:
    receiving, at a computing device, a request from a user that comprises a request for explicit access to information associated with at least one employee from a data table, wherein explicit access rules define one or more rules for the explicit access;
    determining an identity for the user, the identity comprising a role in an organization, wherein the role in the organization is associated with one or more rules defining implicit access to the information associated with the at least one employee of the organization under a span of control of the user and one or more rules defining restrictions to the information associated with the at least one employee, wherein a determination is made whether the explicit access conflicts with the implicit access rules defining restrictions, and when a conflict occurs the implicit access rules take priority;
    responsive to the determination, determining combined access rights based on the determined identity of the user and the request for explicit access to the information, wherein the combined access rights include the one or more rules defining implicit access and the one or more rules defining the restrictions to the information associated with the at least one employee under the span of control of the user;
    upon the determining of the combined access rights, retrieving the information from the data table based on the combined access rights, wherein information is only retrieved after the combined access rights are determined and wherein the combined access rights allow an access to at least one of:
        a first cell of a first column of the data table while restricting access to a second cell of the first column, and
        a third cell of a first row for the data table while restricting access to a fourth cell of the first row; and
    returning the retrieved information obtained from the first cell and the third cell to the user and identifying the second cell and the fourth cell as being restricted.

2. A method of claim 1, further comprising:
    determining implicit access rights to the information stored in the data table based on the determined identity.

3. A method of claim 2, wherein the implicit access rights are based on one or more rules defined for one or more roles within the organization.

4. A method of claim 2, wherein the implicit access rights restrict access to at least one of the second cell of the first column and the fourth cell of the first row.

5. A method of claim 2, wherein determining the combined access rights further comprises:
   recognizing a discrepancy between the implicit access rights and the request for explicit access to the information;
   determining a priority between the implicit access rights and the request for explicit access to the information.

6. A method of claim 5,
   wherein the discrepancy comprises a request for explicit access to the information that is restricted by the implicit access rights, and
   wherein the determined priority restricts the access.

7. A method of claim 1, wherein returning the retrieved information to the user further comprises:
   formatting the retrieved information into a report; and
   returning the formatted report to the user.

8. A method of claim 7, further comprising: displaying the report to the user, wherein the displaying comprises at least one of:
   displaying information from the first cell of the first column while not displaying information from the second-cell of the first column; and
   displaying information from the third cell of the first row while not displaying information from the fourth cell of the first row.

9. A method as of claim 8, wherein not displaying the information from the second cell of the first column and not displaying the information from the fourth cell of the first row comprises displaying an indication that the information of the second cell and the fourth cell has been restricted.

10. A system comprising:
    a first computing device, with a processor, configured to:
    receive a request from a user that comprises a request for explicit access to information associated with at least one employee from a data table, wherein explicit access rules define one or more rules for the explicit access;
    determine an identity for the user, the identity comprising a role in an organization, wherein the role in the organization is associated with one or more rules defining implicit access to the information associated with the at least one employee of the organization under a span of control of the user and one or more rules defining restrictions to the information associated with the at least one employee, wherein a determination is made whether the explicit access conflicts with the implicit access rules defining restrictions, and when a conflict occurs the implicit access rules take priority;
    responsive to the determination, determine combined access rights based on the determined identity and the request for explicit access to the information, wherein the combined access rights include the one or more rules defining implicit access and the one or more rules defining the restrictions to the information associated with the at least one employee under the span of control of the user;
    upon the determination of the combined access rights, retrieve the information from the data table based on the combined access rights, wherein the information is only retrieved after the combined access rights are determined and wherein the combined access rights allow access to at least one of:
       a first portion of a first column for the data table while restricting access to a second portion of the first column, and
       a first portion of a first row for the data table while restricting access to a second portion of the first row; and
    return the retrieved information obtained from the first portion of the first column and the first portion of the first row to the user and identifying the second portion of the first column and the second portion of the first row as being restricted.

11. A system of claim 10, wherein the first computing device is further configured to:
    determine implicit access rights to the information stored in the data table based on the determined identity; and
    determine the combined access rights based on the implicit access rights and the request for explicit access to the information.

12. A system of claim 11, wherein the determined identity comprises a role.

13. A system of claim 11, wherein the implicit access rights are based on one or more rules defined for one or more roles within the system.

14. A system of claim 11, wherein the implicit access rights restrict access to at least one of the second portion of the first column and the second portion of the first row.

15. A system of claim 11, wherein determining the combined access rights further comprises:
    recognizing a discrepancy between the implicit access rights and the request for explicit access to the information;
    determining a priority between the implicit access rights and the request for explicit access to the information.

16. A system of claim 15,
    wherein the discrepancy comprises a request for explicit access to information that is restricted by the implicit access rights, and
    wherein the determined priority restricts the access.

17. A system of claim 10, wherein returning the retrieved information to the user further comprises:
    formatting the retrieved information into a report; and
    returning the formatted report to the user.

18. A system of claim 17, wherein the first computing device is further configured to:
    displaying the report to the user, wherein the displaying comprises at least one of:
       displaying the information from the first portion of the first column while not displaying the information from the second portion of the first column; and
       displaying the information data from the first portion of the first row while not displaying the information from the second portion of the first row.

19. One or more non-transitory computer readable media having stored thereon instructions that, when executed by an apparatus, cause the apparatus to:
    receive a request from a user that comprises a request for explicit access to information associated with at least one employee from a data table, wherein explicit access rules define one or more rules for the explicit access;
    determine an identity for the user, the identity comprising a role in an organization, wherein the role in the organization is associated with one or more rules defining implicit access to the information associated with the at least one employee of the organization under a span of control of the user and one or more rules defining restrictions to the information associated with the at least one employee, wherein a determination is made whether the explicit access conflicts with the implicit access rules defining restrictions, and when a conflict occurs the implicit access rules take priority;
    responsive to the determination, determine combined access rights based on the determined identity and the request for explicit access to the information, wherein the combined access rights include the one or more rules defining implicit access and the one or more rules defining the restrictions to the information associated with the at least one employee under the span of control of the user;

upon the determination of the combined access rights, retrieve the information from the data table based on the combined access rights, wherein the information is only retrieved after the combined access rights are determined and wherein the combined access rights allow access to at least one of:
- a first portion of a first column for the data table while restricting access to a second portion of the first column, and
- a first portion of a first row for the data table while restricting access to a second portion of the first row; and return the retrieved information obtained from the first portion of the first column and the first portion of the first row to the user and identifying the second portion of the first column and the second portion of the first row as being restricted.

* * * * *